Figure 1:
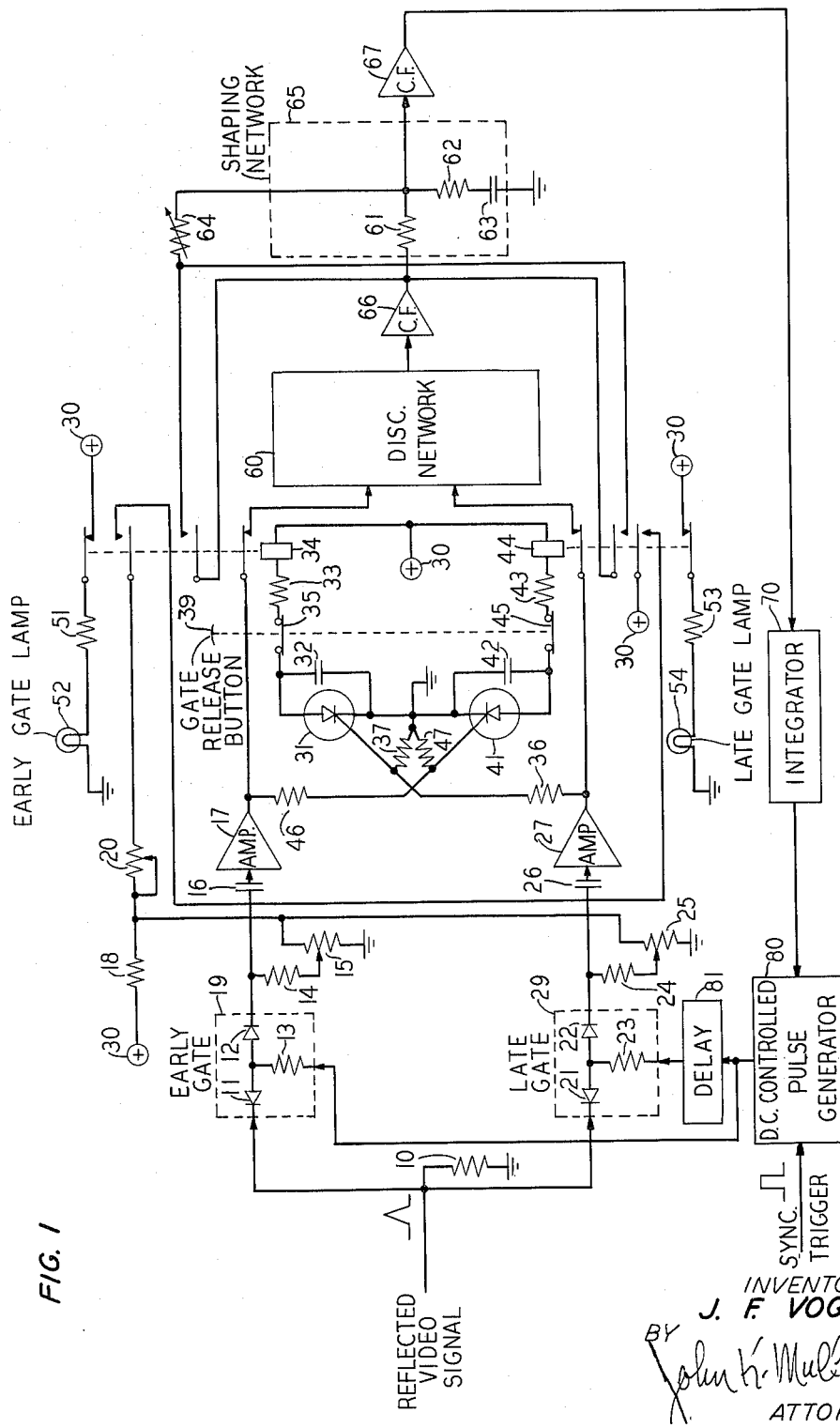

June 28, 1966 J. F. VOGLER 3,258,768
HIGH RESOLUTION ACQUISITION APPARATUS FOR RADAR
Filed Oct. 7, 1964 2 Sheets-Sheet 1

INVENTOR
J. F. VOGLER
BY John K. McCarney
ATTORNEY

United States Patent Office 3,258,768
Patented June 28, 1966

3,258,768
HIGH RESOLUTION ACQUISITION APPARATUS FOR RADAR
John F. Vogler, Winston-Salem, N.C., assignor to Bell Telephone Laboratories, Incorporated, New York, N.Y., a corporation of New York
Filed Oct. 7, 1964, Ser. No. 402,275
10 Claims. (Cl. 343—7.3)

This invention relates to pulse echo systems for tracking high velocity vehicles. More particularly, the invention relates to apparatus for acquiring and tracking the range of a preselected high velocity vehicle.

In pulse echo radar systems, the interval between the transmitted pulse and a reflected impulse is a measure of the range of the vehicle which produced the reflection. If the vehicle is moving in range relative to the radar location, the interval between the transmitted pulse and the reflected impulse will change with time. In order to constantly monitor the range of a particular vehicle, tracking systems have been designed in which gate circuits remain locked to the moving video impulse which represents the vehicle in the conventional video radar display. One well-known technique of tracking is to pass the video impulse through early and late gating circuits to a detector or discriminator network which produces an error signal whenever the early and late gates deviate from a position of straddling the selected video impulse; this error signal in turn causes the early and late gates to move with respect to the transmitted pulse in synchronism with the selected impulse. A typical automatic range tracking system utilizing this technique can be found in Section 9.1 of "Electronic Time Measurement," vol. 20 of the Radiation Laboratory Series published by McGraw-Hill Book Company.

In order to obtain good resolution the early and late tracking gates are maintained as narrow as possible, thereby blocking out all video except that from the preselected target. To acquire a slowly moving vehicle, the operator is able to manually move the gates to a position coincident with the selected video impulse; the error signal produced when the impulse moves causes the tracking loop to lock to the impulse. The video impulse from a high velocity vehicle, however, moves through the narrow tracking gates so rapidly that the error signal which is produced in prior art circuits is usually insufficient to cause the tracking loop to lock onto the impulse. Accordingly, where acquisition of high velocity vehicles is desired, a separate set of much wider gates has been used heretofore solely for the purposes of acquisition. These wider gates are locked to the video impulse only long enough to acquire sufficient energy and information so as to enable the high resolution tracking gates to lock to the selected impulse. This technique of acquisition, utilizing gates of two different widths, performs satisfactorily in the cases where the video impulse from the selected vehicle is dominant and/or isolated from the other video impulse signals. But if the video impulse from a selected target is interspersed with a cluster of other video returns, the acquisition in many cases is of the centroid of the cluster rather than of the preselected vehicle.

An object of the present invention is to provide an acquisition system of greater resolution such that high velocity vehicles may be acquired even in the presence of other video.

Another object of the present invention is to provide an automatic range tracking system which utilizes the same high resolution narrow gates for the purposes of acquisition and tracking.

Still another object of the present invention is to provide a high resolution acquisition system which is relatively insensitive to sporadic impulses of noise.

These and other objects are attained in accordance with the present invention wherein the high resolution tracking gates are also used for the purpose of acquiring high velocity targets. Switching circuitry is utilized between the early-late gates and the discriminator network in order to insure that the first generated error signal will reduce the velocity of the preselected video relative to the tracking gates. The high frequency response of the feedback error loop is also permitted to momentarily exceed the response dictated by stability requirements in order to rapidly develop the initial error signal. As a result, the narrow tracking gates may be locked to a more rapidly moving video impulse.

A feature of the present invention is the elimination of the wide gate generator, time alignment circuitry, and switching circuitry which has been necessary heretofore in prior art systems for the acquisition of high velocity vehicles.

Figure 2:
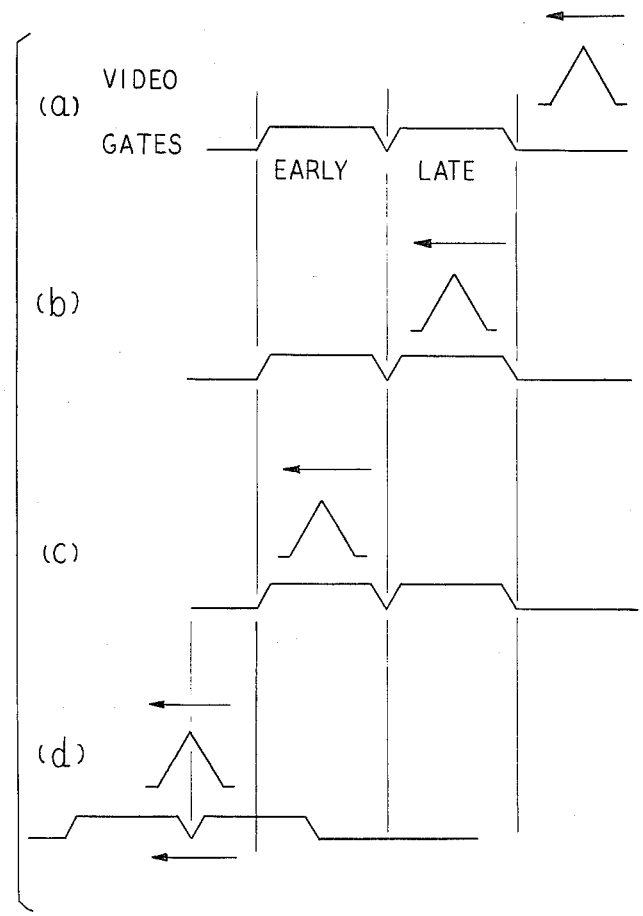

Other objects and many of the attendant advantages of the invention will be readily appreciated as the same becomes better understood by reference to the following detailed description when considered in connection with the accompanying drawings in which:

FIG. 1 is a block and schematic circuit diagram of a portion of a pulse echo system in accordance with the present invention; and FIG. 2 shows wave forms which are useful in describing the operation of the invention.

Referring now to FIG. 1 an embodiment of the invention is shown in the tracking mode of operation, that is, relays 34 and 44 are shown in their operated states as they would be when the circuit is locked to a particular impulse in the reflected video signal. In this mode of operation the invention operates very much like many other automatic range tracking systems as for example, the above-mentioned system from the textbook "Electronic Time Measurements." When the radar transmitter sends out its high frequency energy pulse, a synchronization or triggering pulse is received by D.C. controlled pulse generator 80. After an interval, the length of which is dependent on the value of D.C. voltage applied to the generator by integrator 70, generator 80 produces a positive pulse of definite width at its output which is coupled to early gate 19 and delay network 81. Many well-known circuits may be utilized to perform as generator 80, for example, a phantastron-type circuit in combination with a blocking oscillator. The positive pulse of definite width is coupled through resistor 13 in early gate 19 to the anode of diode 11 thereby causing the latter to be forward biased which in turn allows the positive-going video on the cathode of diode 11 to pass to the anode of diode 12 for the duration of the positive pulse. A small positive potential, determined by the position of the arm of variable resistor 15 and established by the current which flows from potential source 30 through resistor 18 and resistor 15 to ground, is connected through resistor 14 to the cathode of diode 12. This small positive potential serves to back bias diode 12 causing the latter diode to act as a diode base clipper in preventing low level noise in the received video signal from passing along with the desired video through coupling capacitor 16 to amplifier 17. Amplifier 17 delivers the early gated video through a closed contact of relay 34 to one input of discriminator network 60.

The positive pulse from generator 80 is also coupled through delay network 81 to resistor 23 of late gate 29. The delay provided by network 81 is such that late gate 29 begins operation substantially simultaneously with the turnoff of early gate 19. In other respects the operation of elements 21 through 27 is identical to the operation of elements 11 through 17 respectively, and amplifier 27 passes a later segment of the reflected video signal to a second input of discriminator network 60.

Discriminator network 60 produces a signal at its output whenever a difference in potential exists between the two signals which are presented to its inputs. Many such networks can be found in the prior art, for example in Patent 2,940,042 of June 7, 1960 to K. A. Fisher. The output of network 60 is coupled through cathode follower 66 to shaping network 65, composed of resistor 61, resistor 62 and capacitor 63. The shaping network provides attenuation at high frequencies which is necessary in order to prevent the tracking loop from oscillating. The output of the shaping network is coupled through cathode follower 67 to integrator 70. Cathode followers 66 and 67 merely serve to isolate the shaping network and prevent the circuits to which it is connected from shifting the attenuation break frequency. As will be appreciated by those skilled in the art, the term break frequency has reference to that frequency at which attenuation increases substantially. The error signal impulses from discriminator 60 are filtered by shaping network 65 and passed through integrator 70 to generator 80. Integrator 70 is a conventional integration circuit which maintains a D.C. potential at its output during the interval between gating and changes this potential in accordance with the signal from shaping network 65 thereby causing the generator to change the duration of the interval between the synchronization pulse and the produced pulse of definite width in such a direction so as to minimize the error signal. Zero error signal at the output of discriminator 60 is produced when the early and late gates are straddling the selected video impulse such that the video impulse presents equal potentials to each of the gates.

Assume that a high velocity vehicle is approaching the radar location. An indication of this may be obtained on the customary A-scope display of the reflected video signal on which the video pulse representing the high velocity target would be rapidly moving from right to left toward the synchronization pulse. In order to acquire this target, the operator presses gate release button 39 shown in FIG. 1 thereby opening normally closed contacts 35 and 45 which in turn causes the silicon controlled rectifiers (SCR) 31 and 41 to be turned off and relays 34 and 44 to be unoperated. Capacitors 32 and 42 are standard circuit precautions utilized to prevent transients from firing the SCR's. The paths between amplifiers 17 and 27 and discriminator network 60 are now open circuited, and the operator while maintaining the gate release button in a depressed condition may manually position the output pulse of the D.C. controlled pulse generator until the early and late gates occupy a position on the A-scope display immediately preceding the desired video pulse as shown in FIG. 2(a). Gate release button 39 is then released in preparation to acquiring the selected impulse. Relays 34 and 44 remained unoperated of course since SCR's 31 and 41 will not fire and complete the relay circuit through to ground until a positive impulse of sufficient magnitude is presented to their control electrodes. Low valued resistors 37 and 47 by-pass the control electrodes to ground in order to prevent firing of the SCR's by induced spurious impulses. Resistors 36 and 46 couple SCR's 31 and 41 to the output of amplifiers 27 and 17 respectively, and are determined in value by the required voltage level for firing of the SCR's.

With relays 34 and 44 in their unoperated state, resistor 20 is connected through a normally closed contact of relay 34 and a normally closed contact of relay 44 to potential source 30. This connection places resistor 20 in parallel with resistor 18 thereby causing a higher positive potential to appear on the cathodes of diodes 12 and 22. This higher back bias potential on diodes 12 and 22 is provided in order to give added insurance that the SCR's 31 and 41 will not be fired by a sporadic impulse of noise during the aquisition period. Such a firing of either SCR 31 or 41 would cause an unwanted operation of relays 34 or 44.

When the desired video impulse moves into a position coincident with the late gate as shown in FIG. 2(b), amplifier 27 passes the impulse to the control electrode of SCR 31 thereby causing the latter to fire and operate relay 34. It should be noted however that the late gated video is unable to pass to discriminator network 60 since relay 44 has not as yet been operated. Operation of relay 34 causes the path between resistor 20 and potential source 30 to be open circuited and causes operation of early gate lamp 52 thereby indicating that the path between amplifier 17 and network 60 is closed and prepared to receive early gated video. It should be noted at this point that the first engagement of the gates with the video impulse does not cause the circuit to produce an error signal as in many of the prior art automatic tracking systems but merely prepares the circuit to respond in the advantageous manner to be hereinafter described.

When the video impulse moves into a position coincident with the early gate as shown in FIG. 2(c), amplifier 17 passes the video impulse to one input of discriminator network 60 and to the control electrode of SCR 41. SCR 41 fires and operates relay 44 causing late gate lamp 54 to be energized indicating that the path between amplifier 27 and network 60 has now been closed. The appearance of a pulse on one input of discriminator network 60, causes an output at the integrator which drives the gates in the direction in which the video impulse is traveling. Accordingly, one advantage to the instant invention is that the first movement of the gates is in a direction such that the relative velocity between the gates and the desired impulse is reduced rather than increased as in prior art tracking systems.

In addition, the gates in the present invention are caused to move toward the video impulse with a velocity in excess of the normally attainable velocity of a stable tracking loop system. For although the pulse from amplifier 17 causes SCR 41 to fire substantially instantaneously, relay 44, as is usual for electromechanical devices, does not operate simultaneously with the application of an activating voltage. Accordingly, the normally closed contact which connects resistor 64 to resistor 61 does not operate instantaneously, and the output of discriminator network 60 is initially fed to a modified shaping network which has a higher break frequency than shaping network 65 by virtue of the fact that resistor 64 is in parallel with resistor 61. As a result, the bandpass of the tracking loop is extended beyond that which is normally dictated by stability requirements, and a higher energy content error signal is produced whereby relative velocity of the tracking gates and video is more rapidly reduced. After a short period of delay and prior to the generation of the next radar pulse, relay 44 does operate its contacts, resistor 64 is removed from its parallel connection with resistor 61 thereby restoring the normal shaping network required for stability, and the video is locked within the gates.

If the break frequency of the modified shaping network is too high, the gates will take off more rapidly than the video impulse is moving. This condition can easily be corrected by adjusting variable resistor 64 to eliminate the bounce in video impulse observed on an oscilloscope trace displaying the video and synchronized to the gates. The values of the modified break frequency which is desirable for any given circuit is dependent on the amount of delay which exists in the relays 34 and 44 between activation and operation. Relays having a shorter delay require a higher modified break frequency, hence a lower value for resistor 64, in order to establish a higher energy content error signal within a shorter period of time.

After both relays 34 and 44 are operated, the circuit is back in the normal mode of tracking and the gates will remain locked to the selected video impulse in the position shown in FIG. 2(d). If the video which has been acquired turns out to be an unwanted vehicle in a cluster of vehicles, the gates may be locked to other impulses representing succeeding vehicles simply by momentarily depressing the gate release button, thereby causing the gates to hop from one impulse to the next succeeding impulse in the cluster. It should also be apparent to those skilled in the art that although the operation of the invention has been described in terms of a vehicle which was approaching the radar location, the invention works equally well, and has a similar operation, for vehicles which are moving away from the radar. In the latter situation the impulse is caused to first engage the early gate rather than the late gate.

When has been described hereinbefore is a specific illustrative embodiment of the principles of the present invention. It is to be understood that numerous other arrangements of physical parts and different components may be utilized with equal advantage. For example, other type gate circuits may be employed and electronic switching circuits may be substituted for relays 34 and 44. In addition, it should be noted that the invention is not restricted to radar and may be utilized in any apparatus where a changing time interval between a recurring impulse and a periodic synchronization pulse is required to be presented as a changing voltage.

Accordingly, it is to be understood that the above-described arrangement is merely illustrative of the application of the principles of the present invention, and numerous modifications thereof may be devised by those skilled in the art without departing from the spirit and scope of the invention.

What is claimed is:

1. A tracking loop for a pulse echo radar system comprising early and late gating means for passing to their respective outputs adjacent time segments of video representing received echoes, means for activating said early and late gating means at instants which are changed with respect to the transmitted pulse of the system in response to an error signal, means having two inputs for providing the aforementioned error signal in response to a difference in potential between the signals presented to the two inputs, first switching means for connecting the early gating means to one of said two inputs in response to an impulse at the output of the late gating means, and second switching means for connecting the late gating means to the other of said two inputs in response to an impulse at the output of the early gating means.

2. Apparatus as defined in claim 1 wherein the means for providing the error signal includes a shaping network having a high frequency attenuation characteristic having a break frequency, and the first and second switching means include means for changing the break frequency.

3. Apparatus as defined in claim 2 wherein the early and late gating means include base clipping means having at least two distinct levels of clipping, and the first and second switching means include means for changing the level of base clipping.

4. In a pulse echo radar system which uses a tracking loop to monitor the range of a moving vehicle, said tracking loop comprising early and late gating means for passing to their respective outputs adjacents time segments of video representing received echoes, generator means for activating said early and late gating means at instants which are changed with respect to the transmitted pulse of the system in response to an error signal, discriminator means having two inputs and a single output for producing an error signal at its output in response to a potential difference between the signals presented to its two inputs, first switching means having a control element for connecting the early gating means to one of the inputs of said discriminator means, second switching means having a control element for connecting the late gating means to the other input of said discriminator means, means for activating the control element of the first switching means in response to an output from said late gating means, means for activating the control element of the second switching means in response to an output from said early gating means, network means having a high frequency attenuation characteristic with a break frequency for connecting the error signal from said discriminator means to said generator means, and means for changing the network means to a lower break frequency a predetermined interval after the first and second switching means have been activated.

5. A system as defined in claim 4 wherein the early and late gating means include base clipping means having at least two distinct levels of clipping, and the first and second switching means include means for providing the highest level of base clipping only when neither control element has been activated.

6. In a pulse echo radar system which utilizes a tracking loop for correcting errors in range tracking, said tracking loop comprising early and late gating means for passing to their respective outputs adjacent time segments of video representing received echoes, generator means for activating said early and late gating means at instants which are changed with respect to the transmitted pulse of the system in response to an error signal, means having two inputs and a single output for providing the error signal to said generator means in response to a potential difference between the signals at its two inputs, first relay means having a normally open contact connected between the early gating means and one of said two inputs, second relay means having a normally open contact connected between the late gating means and the other of said two inputs, first diode means having a control element connected to said late gating means for operating said first relay means in response to an impulse in the late gated video, second diode means having a control element connected to said early gating means for operating said second relay means in response to an impulse in the early gated video, and manually operated switching means for preventing each diode means from activating its respective relay means.

7. A system as defined in claim 6 wherein the means for providing the error signal includes a shaping network having a changeable high frequency attenuation characteristic, and the first and second relay means include contacts which change the attenuation characteristic to a lower break frequency when both relay means have been operated.

8. A system as defined in claim 7 wherein the early and late gating means include a base clipping means having a changeable clipping level, and the first and second relay means include contacts which operate the base clipping means to its highest clipping level only when both relay means are not operated.

9. Apparatus for producing an output voltage the value of which indicates the time interval in a received signal between a recurring impulse and a periodic synchronization pulse comprising early and late gating means for periodically passing to their respective outputs short adjacent time segments of the signal in the interval between successive synchronization pulses, voltage controlled pulse generator means for activating the early and late gating means at an interval after the synchronization pulse which depends on the value of the output voltage, means having two inputs and a single output for providing an error signal in response to a potential difference between the signals at its two inputs, first switching means for connecting the early gating means to one of said two inputs in response to the appearance of the impulse in the output of said late gating means, second switching means for connecting the late gating means to the other of said two inputs in response to the appearance of the impulse in the output of said early gating means, and integrator means for receiving the error signal and changing the output voltage in a direction so as to diminish the error signal.

10. Apparatus as defined in claim 9 wherein the means for providing an error signal includes a shaping network having a changeable high frequency attenuation characteristic, and the first and second switching means include means for changing the break frequency of the attenuation characteristic.

References Cited by the Applicant

UNITED STATES PATENTS 2,746,032  5/1956  Moore.
2,940,073  6/1960  Spranger et al.
3,051,946  8/1962  Straehl.

OTHER REFERENCES

Vol. 20, Radiation Laboratory Series, "Electronic Time Measurements," 1949, Section 9.1, page 342.

CHESTER L. JUSTUS, *Primary Examiner.*

T. H. TUBBESING, *Assistant Examiner.*